PATENTED NOV 2 1971  3,617,036

INVENTOR
Thomas L. Brown

BY Schmidt, Johnson, Hovey, Williams & Chase
ATTORNEYS

United States Patent

[11] 3,617,036

| [72] | Inventor | Thomas L. Brown<br>Mission, Kans. |
|---|---|---|
| [21] | Appl. No. | 846,757 |
| [22] | Filed | Aug. 1, 1969 |
| [45] | Patented | Nov. 2, 1971 |
| [73] | Assignee | The Marley Company<br>Kansas City, Mo. |

[54] NOZZLE
13 Claims, 17 Drawing Figs.

[52] U.S. Cl..................................... 261/111,
239/498, 261/DIG. 11
[51] Int. Cl..................................... B01f 3/04
[50] Field of Search........................... 261/111,
98, 114 VT, DIG. 11; 239/498, 223

[56] References Cited
UNITED STATES PATENTS

| 533,890 | 2/1895 | Hart | 239/498 X |
|---|---|---|---|
| 540,864 | 6/1895 | Lewis | 239/498 X |
| 1,253,234 | 1/1918 | Haas | 261/111 |
| 1,931,689 | 10/1933 | Evans | 239/498 |
| 2,517,639 | 8/1950 | DeFlon | 261/DIG. 11 |
| 2,550,456 | 4/1951 | DeFlon | 239/498 |
| 2,681,217 | 6/1954 | Pennington et al. | 261/98 |
| 2,994,484 | 8/1961 | Stearns | 239/224 |
| 3,309,028 | 3/1967 | Zieg et al. | 239/498 |

FOREIGN PATENTS

| 48,666 | 6/1911 | Austria | 261/111 |

Primary Examiner—Tim R. Miles
Attorney—Schmidt, Johnson, Hovey and Williams

ABSTRACT: Liquid-stream control and diffusion structure for each of the apertures in the hot-liquid distributor which overlies the fill assembly of a liquid-cooling tower. Each structure is provided with a tubular liquid-metering component adapted to be received in a corresponding aperture and a target below the metering component defined by a generally planar section provided with a series of slots therein partitioning the section into a series of outwardly projecting, individual segments located to divide the stream of hot liquid gravitating onto the target section from the metering component thereabove into an umbrella-shaped liquid pattern with spoke defining interior liquid sheets to thereby break up the column of water discharged from the metering component and assure relatively uniform distribution of the liquid over the plan area of the fill assembly therebelow served by that control and diffusion structure.

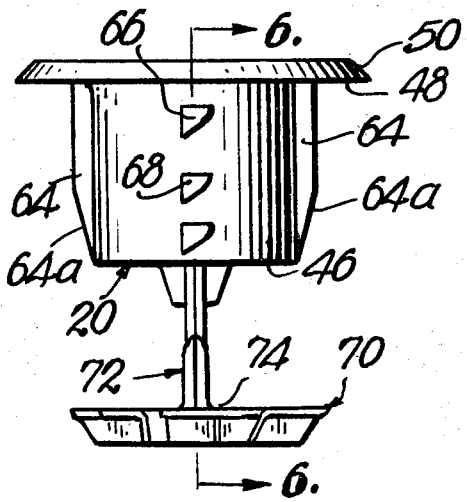

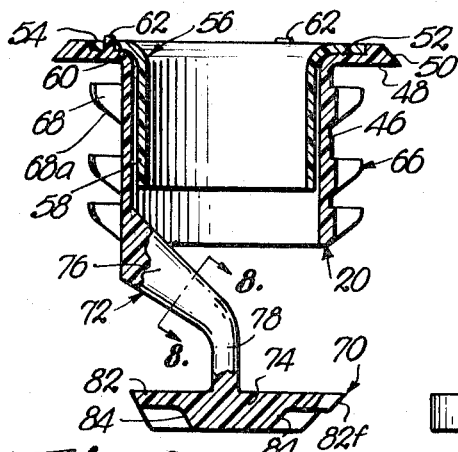
Fig. 6.
Fig. 8.
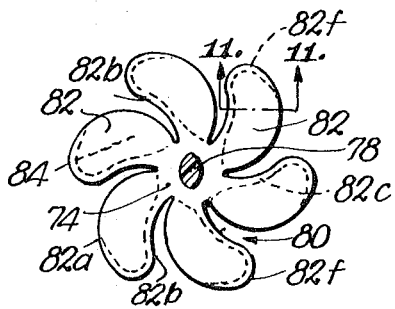
Fig. 9.
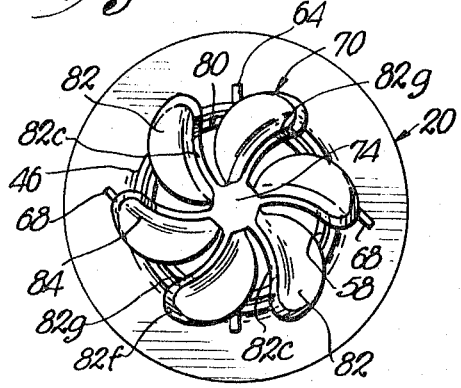
Fig. 7.
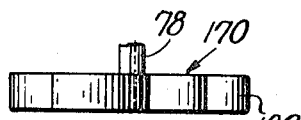
Fig. 12.
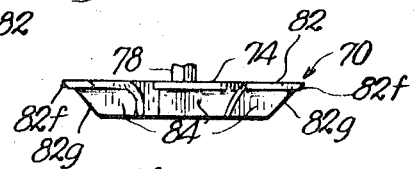
Fig. 10.
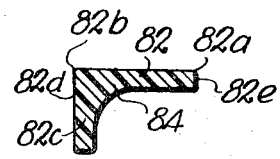
Fig. 11.
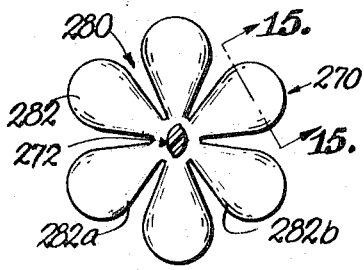
Fig. 13.
Fig. 15.
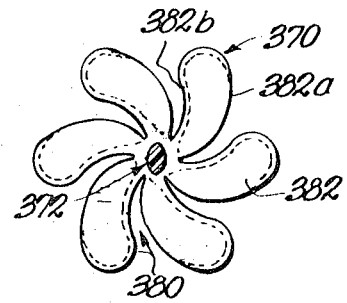
Fig. 16.
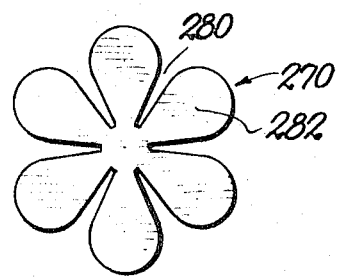
Fig. 14.
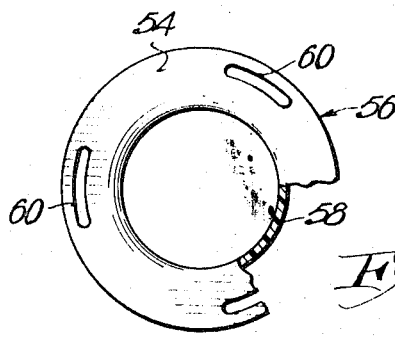
Fig. 17.
INVENTOR
Thomas L. Brown
BY Schmidt, Johnson, Hovey, Williams & Chase
ATTORNEYS

NOZZLE

This invention relates to water-cooling towers and particularly to improved nozzle structure for metering the flow of hot liquid through apertures in the floor of a hot-water distribution basin overlying the fill assembly of the tower and operable to break up the stream of water gravitating through each distributor aperture to obtain relatively uniform distribution of the hot liquid over that portion of upper face of the fill below the nozzle structure served thereby without the necessity of employing intermediate diffusion decks as has heretofore been required.

In a conventional water-cooling tower of the forced or induced draft type, it is the usual practice to provide an open-top hot-water distribution assembly in overlying relationship to an air-liquid contact fill assembly located above a cold-water collection basin. Hot water is maintained in the distributor above the fill assembly and permitted to gravitate therefrom through a series of orifices in the horizontal floor of the hot water distributor. For convenience and ease of fabrication and to minimize the number of components which must be stocked as well as deterioration to the wooden floor of the distributor around each orifice, it has long been standard procedure to provide removable tubular nozzles in each of the distributor floor apertures. These nozzles have generally been fabricated of corrosion resistant materials such as porcelain, hard rubber or synthetic resin, and provided with a central cylindrical body section which extends downwardly through the corresponding aperture and an upper flange adapted to rest relatively flatly on the floor of the distributor around the aperture. Use of removable nozzles was of advantage in that the water loading on the fill assembly could be varied as desired by changing the nozzles to provide different size water-metering cylindrical passages therethrough. In addition, the provision of nozzles of varying effective diameter permitted construction of hot water distributors of uniform components without regard for the particular water-loading conditions needed for a specific job.

However, the stream of liquid discharged from the outlet of each cylindrical nozzle passage was in the form of a relatively compact column of liquid gravitating toward the fill assembly. In order to break up each of the streams of water discharged from spaced nozzles in the distributor, it was usually desirable to provide a diffusion deck of the general type shown in U. S. Pat. No. 2,419,452 in direct underlying relationship to the nozzles and immediately above the first horizontal slats or contact surfaces of the fill assembly. These diffusion decks usually comprised a series of wooden slats in one layer intersected by another group of slats to form a grid arrangement wherein a spreader bar is located directly beneath each row of nozzles so that the columns of water impinging on the diffusion deck were broken up and fragmented before gravitational flow of the water onto the air-liquid contact fill.

Although this cooperable assembly of nozzles of required orifice size and wooden diffusion decks positioned thereunder was satisfactory and performed with reasonable efficiency under varying water-loading conditions and operating parameters, the use of diffusion decks presented problems from the standpoint of cost, complexity of erection in the field, and the problem of fire hazard presented by the wooden diffuser.

It is, therefore, the primary object of the present invention to provide an integrated liquid-stream control and diffusion nozzle structure capable of being readily inserted in a standard sized aperture in the floor of a hot-water distributor forming a part of the liquid-cooling tower and which is uniquely constructed to not only meter the flow of liquid therethrough, but also break the column of liquid discharged from the metering portion of the structure, into a pattern which assures uniform distribution of the water over that section of the fill served by a respective nozzle structure to thereby completely obviate the necessity of providing a separate diffusion deck in underlying relationship to the hot-water distributor.

A further important object of the invention is to provide a hot-water distribution nozzle as described which is adapted for insertion from the top of the water distributor for ease of installation, which may be fabricated and distributed as a unitary assembly for handling ease in the field, of a design permitting use thereof under varying water loadings on the fill assembly and different water levels in the hot-water distribution assembly, and which can be manufactured at minimum cost, preferably by synthetic resin injection molding techniques.

Another very important object of the invention is to provide an improved hot-water distribution nozzle wherein inserts of different diameter may be provided in the main tubular component of the structure designed for insertion in respective distributor apertures so that the effective orifice size of the nozzle may be varied as desired by simply mounting a metering orifice of selected size in the essentially unitary structure.

A further important object of the invention is to provide a hot-water distribution nozzle of the characteristics referred to above wherein a liquid-diffusing target is located below the metering orifice of the structure in disposition such that water cascades from the target in a substantially umbrella shaped pattern and wherein the target has a series of outwardly extending slots therein dividing the target member into a series of individual petal-shaped segments so that spoke-shaped sheets of water form below the slots and extend inwardly from the periphery of the umbrella of water to thereby assure uniform distribution of the water over a relatively wide area of the fill assembly therebelow so that use of an intermediate grid diffuser of conventional construction is avoided.

An additional important object of the invention is to provide a unique nozzle as described wherein the slots in the target member are of longitudinally arcuate configuration to partition the target into curved segments whereby water striking the target and flowing outwardly from the central section thereof flows along radial paths of varying diameter to the end that the nozzle is capable of handling varying water levels in the hot-water distribution basin and varying nozzle orifices without significant variation in the water breakup characteristics of the diffusion target by virtue of the fact that water flows through the slots of the target as well as over the periphery thereof somewhat in proportion to the volume of water delivered against the target per unit of time and thereby assuring formation of the desired umbrella shape as well as the interior inwardly extending sheets thereof below respective slots under all water-loading conditions and flow rates through the metering orifice of the nozzle. In this connection, also an object of the invention is to provide a nozzle wherein the slots in the diffusion target are each defined by a wall surface of major width vertically and an opposed wall face of narrower vertical width so that maintenance of the desired umbrella pattern with interior spoke-defining sheets of water below each slot is assisted under varying water loadings on the target because of the Coanda effect produced by the difference in surface areas of the walls defining corresponding slots in the target.

A still further important object of the invention is to provide a distribution nozzle for the hot-water distributor of a water-cooling tower which is capable of metering the flow of liquid through a respective distributor aperture and to effect breakup of the water prior to impingement thereof against the fill assembly, with the target below the metering cylinder being of essentially self-cleaning characteristics so that foreign materials, particularly those of a stringy nature will not adhere to the target and thereby decrease its effectiveness.

Other objects of the invention and advantages inherent in the construction and use thereof will become apparent or be explained as the detailed description hereunder progresses. In the drawings:

FIG. 1 is a fragmentary, generally vertical cross-sectional view of a conventional crossflow, induced-draft water-cooling tower provided with a hot-water distributor, an air-liquid fill assembly below the distributor, and a cold-water collection basin beneath the fill, with the improved nozzle structure of the present invention being illustrated in each of the apertures in the floor of the hot-water distributor, directly above the upper face of the fill assembly;

FIG. 2 is a fragmentary, vertical cross-sectional view through a part of the hot-water distributor and illustrating a nozzle of the present invention in essentially schematic form with the water pattern produced by the diffusion target of the structure being shown schematically by the curved lines while the normal level of the upper face of the fill assembly is indicated by the horizontal dash-dot line;

FIG. 6 is a vertical cross-sectional view taken substantially on the line 6—6 of FIG. 5;

FIG. 7 is a bottom view of the nozzle structure shown in FIG. 5;

Figure 5:
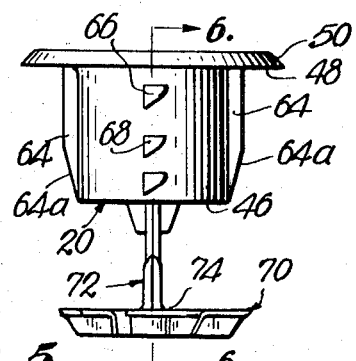
FIG. 5 is a side elevational view of the nozzle illustrated in FIG. 4.

FIG.* is a cross-sectional view on the line 8—8 of FIG. 6;

FIG. 9 is a horizontal cross-sectional view through the target support illustrated in FIGS. 5 and 6 and showing the target in plan view;

FIG. 10 is a side elevational view of the target portion of the nozzle as illustrated in FIG. 9;

FIG. 11 is an enlarged vertical cross-sectional view taken on the line 11—11 of FIG. 9;

FIG. 12 is a side elevational view of a modified target constructed in accordance with the invention;

FIG. 13 is a horizontal cross-sectional view similar to FIG. 9 but illustrating a further modified type of target usable in the present invention, FIG. 14 is a plan view of the target illustrated in FIG. 13;

FIG. 15 is an enlarged vertical cross-sectional view taken substantially on the line 15—15 of FIG. 13;

FIG. 16 is a horizontal cross-sectional view similar to FIGS. 9 and 13 but illustrating another type of target embodying the concepts of this invention; and FIG. 17 is a plan view of the metering cylinder forming a part of the tubular component of the nozzle structure, with a portion of the flange of the metering cylinder being broken away and in section. Distribution nozzle structure constructed in accordance with the preferred embodiment of the present invention is illustrated in FIGS. 4 to 11, inclusive, and is broadly designated by the numeral 20. The nozzle is especially suitable for use in an induced-draft crossflow cooling tower essentially schematically shown in cross section in FIG. 1 and numerated 22. Although not detailed, it is to be understood that the central stack section 24 of tower 22 is provided with a fan for pulling air in through the inlet 26 and cause such air to be moved through the fill assembly 28 in crossflow relationship thereto for ultimate discharge vertically through stack section 24. Fill 28 is in direct overlying relationship to a cold-water collection basin 30 while a hot-water distributor broadly designated 32 is located directly above the upper face of fill assembly 28. Normally the distributor 32 in the typical crossflow cooling tower has an open top and is defined by a horizontal floor 34, opposed sidewalls 36, an outer end wall 38 and inner end wall 40. These distributor components are normally constructed of wood because of its corrosion resistance and availability at a reasonable price.

In order to effect distribution of hot water over the entire upper face of fill assembly 28, floor 34 is conventionally provided with a series of apertures 42 therein which are generally located in spaced relationship defining a substantially rectangular grid pattern. Hot water continuously introduced into the distributor 32 by a pump forming a part of the cooling package generally accumulates above floor 34 to a predetermined level 44 which is a function of the number of apertures 42, the amount of water which is permitted to flow therethrough per unit of time and the rate at which hot water is returned to distributor 32. The operator of tower 22 determines how much water must be cooled and after proper sizing of the tower for that demand, a nozzle structure 20 is positioned in each of the apertures 42 to effect uniform distribution of the hot water onto fill assembly 28 and at the same time properly meter flow of water through corresponding apertures to maintain a required waterhead in distributor 32 so that gravitational flow of hot liquid through all of the nozzle structures 20 at a uniform rate is assured.

As previously noted, it is well known to provide cylindrical nozzles in apertures 42 of floor 34, but these nozzles have served only as metering orifices and it was heretofore necessary to provide a slat diffusion deck in the form of a grid below the metering nozzles to effect substantially uniform distribution of the hot water over the entire upper face of the fill assembly below floor 34.

Each of the nozzle structures 20 is uniquely designed to perform the required metering function by controlling the rate of flow of hot water therethrough in relationship to the waterhead thereon, and at the same time break up the liquid flowing through the metering component of each nozzle structure prior to impingement of the hot liquid against the fill assembly so that the hot water is uniformly distributed over the upper face of the fill assembly without the necessity of providing intermediate diffusion deck structure heretofore found to be absolutely essential in cooling towers of the type referred to herein.

Since all of the nozzle structures 20 adapted to be positioned within corresponding apertures 42 are of identical construction, only one of the nozzles has been illustrated in detailed form in the drawings and the specific description thereof will be limited to the nozzle structure comprehensively shown in the FIGS. 4 to 11, inclusive.

Figure 1:
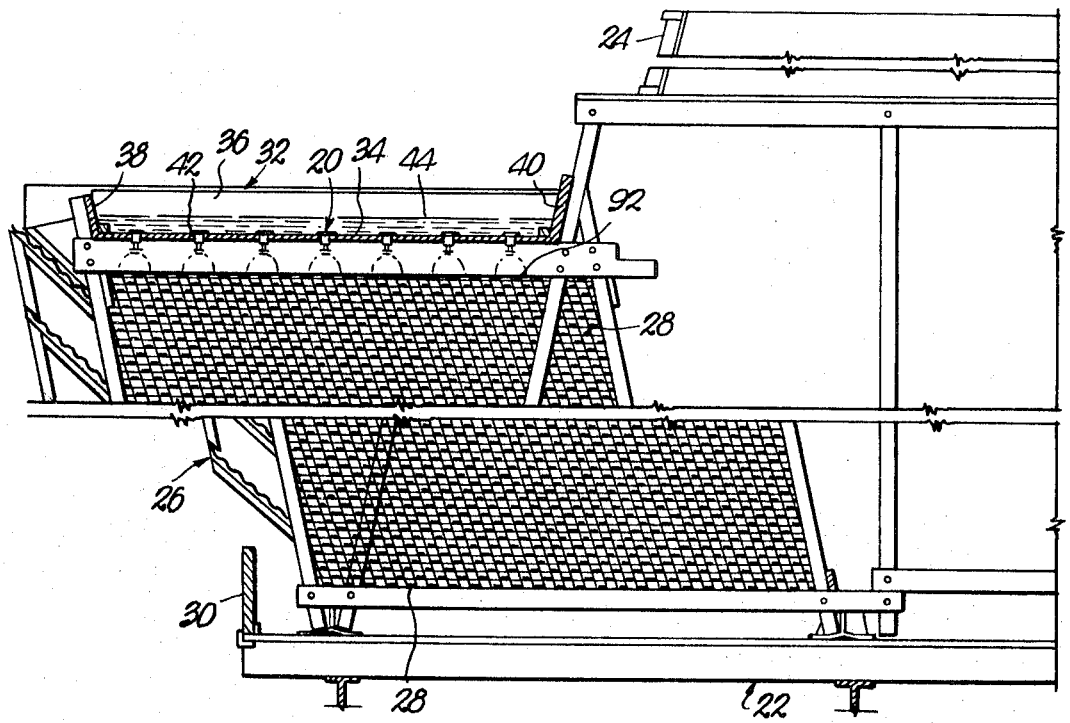
Figure 2:
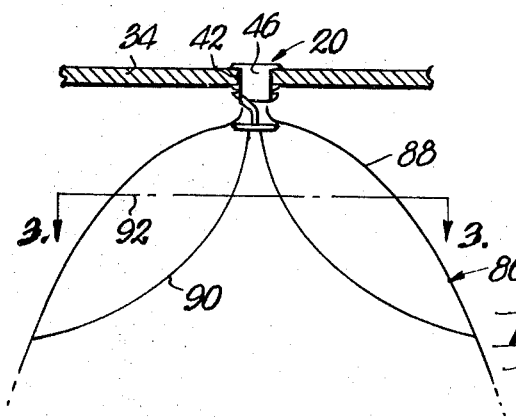

The metering component of nozzle structure 20 comprises an outer cylindrical jacket 46 of a diameter to be substantially complementally received within a corresponding aperture 42 as is apparent from FIGS. 1 and 2. It is to be understood in this respect that the apertures 42 are generally of a standard size and thus the cylindrical sidewall of jacket 46 may be of uniform dimensions notwithstanding the fact that metering cylinders of different sizes are positioned in the jacket as will be explained hereinafter.

An annular flange 48 integral with the upper cylindrical margin of jacket 46 and projecting outwardly therefrom is adapted to lie in flat engagement with the upper face of floor 34 of distributor 32. The outer peripheral margin 50 of flange 48 is preferably beveled at an angle of about 45°to present a smooth surface and preclude accumulation of foreign materials, particularly those of a stringy nature, around the circumference of the metering component of nozzle structure 20.

Flange 48 is provided with an annular groove 52 (FIG. 6) in the upper face thereof which is adapted to complementally receive the annular flange portion 54 of a metering cylinder 56 having a cylindrical main body 58 telescoped into jacket 46. As will be explained the effective internal diameter of body 58 is sized to meter the flow of hot liquid therethrough and, consequently, the metering cylinder 56 is constructed so as to permit mounting of various sized cylinders in jacket 46 depending upon the flow rate selected for the particular cooling tower 22. The flange portion 54 of metering cylinder 56 is provided with three arcuate, equidistantly spaced slots 60 therein (FIG. 17) which are adapted to receive the integral protuberances 62 projecting upwardly from flange 48 within groove 52 thereof. Since it is contemplated that the entire nozzle structure 20 be fabricated of a material such as an injection moldable synthetic resin, it is to be noted that the section 74 has an effective overall diameter substantially the same as the jacket 46 so that the entire assembly may be forced downwardly through aperture 42 without interference of any kind. In addition, nozzle structure 20 has been found to be effective under heads varying from 1 inch up to 5 inches or more which are those normally encountered in the normal operation of a cooling tower such as type illustrated in FIG. 1.

Maximum level waterheads do not present nearly the problems encountered with low level operation where the head approaches 1 inch or less. These variations in fact can occur during operation of the cooling tower 22, especially from one season to another where water demands change and therefore the nozzle structure 20 desirably should be able to function properly at different water levels which can be expected to occur from time to time as different operating parameters occur. At low water levels, cavitation is a serious problem as air is drawn into the vortex of water formed in each metering cylinder 56. This entrainment of air in the water makes it extremely difficult to maintain a proper water pattern from the diffusion section 74 but the shape and location of slots 80 has been found to accomplish this desirable result even under the adverse operating conditions of very low waterheads where cavitation is a factor.

In addition, the provision of a separate metering cylinder 56 which can be rigidly secured to jacket 46 is an important feature of nozzle structure 20 in that the section 74, support 72 and jacket 46 may be molded as one piece of standard size and a number of different cylinders 56 then constructed for assembly with jacket 46 depending upon the specific requirements for a particular job. The number of parts which must be stocked may then be minimized and proper metering cylinders 56 placed in jackets 46 at the time of order for a specific cooling tower 22.

Water-diffusion target means broadly designated 70 is suspended below jacket 46 and the metering cylinder 56 therewith as best shown in FIGS. 5 and 6, with the L-shaped support 72 connected to the lower margin of jacket 46 serving to support diffusion section 74 directly under the outlet of main body 58 of metering cylinder 56. Support 72 has an upper stretch 76 connected to the lower margin of jacket 46 extending inwardly therefrom at an angle with respect to horizontal, as well as a lower vertical stretch 78 which is integral with the central part of section 74 so as to maintain the upper face of the latter substantially horizontal when nozzle structure 20 is mounted on horizontal bottom wall 34. It is to be appreciated that the diffusion section 74, support 72 and the tubular component made up of jacket 46 and flange 48 are all adapted to be molded of a synthetic resin material or other equivalent composition as a one-piece monolithic body.

The section 74 has a series of elongated slots 80 therein which extend outwardly from the central part of section 74 in equidistantly spaced relationship around the periphery thereof to partition section 74 into a number of independent, longitudinally arcuate petal-shaped segments 82.

The slots 80 increase in width as the outermost extremity thereof is approached causing the margin 82a of each petal segment 82 to have a somewhat greater diameter than the margin 82b thereof. This increase in width serves to prevent accumulation of foreign materials, particularly those of a stringy nature, on the petal-shaped segments 82 of diffusion section 74.

The underfaces of each of the petal-shaped segments 82 are relieved as shown in the cross-sectional view of FIG. 11 to present arcuate grooves 84 which thereby cause the rib portion 82c of each segment 82 to have a substantially greater effective vertical height-adjacent margin 82b than effective thickness of the segment at the margin 82a thereof (FIGS. 9 and 11). As a consequence, the vertical height of wall surface 82d or rib portion 82c is many times greater than the effective vertical height of wall face 82e of each segment 82 to increase the Coanda effect of the slots 80 as will be explained. The outer peripheral margin 82f is beveled at an angle of about 45°and each rib portion 82c merges into beveled margin 82f at an angle of about 45°as illustrated by the surfaces 82g of FIG. 10.

Figure 3:
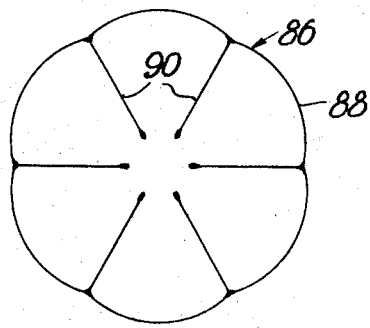
FIG. 3 is an essentially schematic representation in plan view of the water pattern illustrated in FIG. 2.

Upon insertion of nozzle structure 20 in a corresponding aperture 42 in floor 34 of distributor 32, and after hot water has reached the level 44 in the hot-water basin, water flowing through the metering cylinder 56 impinges upon the upper face of target section 74 and the essentially cylindrical stream of water is broken up into an umbrella pattern depicted schematically in FIGS. 2 and 3 wherein it can be seen that the water cascading from the periphery of section 74 forms an outer umbrella 88 along with a series of spoke-defining water sheets 90 below each slot 80 and formed thereby. As a consequence, the column of water from the outlet of cylindrical metering body 58 is broken up into a pattern which assures relatively uniform distribution of hot water over that section of the upper face 92 of the fill assembly 28 below distributor 32 which is served thereby.

Tests have established that the umbrella pattern 86 is produced under varying waterheads on nozzle structure 20 and with difficult sized metering orifices produced by metering cylinders 56 of varying effective diameters. It is believed that this wide range of effective operation is attributable to the relatively wide vertical height of wall surfaces 82d of each petal-shaped segment 82 as compared with the opposed relatively narrow wall face 82e of each segment. As water falls onto the upper face of section 74, it tends to move radically outwardly from the central part thereof so that when the water no longer encounters support therefor it tends to fall vertically under the influence of gravity thereon. Because of the arcuate nature of slots 80, water moving radially from the central area of section 74 encounters support of varying effective diameter. The radial lines of effective width of section 74 vary around the circumference of the periphery of the diffusion section and therefore some of the water must flow over the entire length of each petal-shaped segment 82 while other parts of the water may immediately fall from the section through the innermost part of a corresponding slot 80. The umbrella-shaped pattern 86 depicted in FIGS. 2 and 3 thereby results. Maintenance of such umbrella pattern at varying water loadings and flow rates through metering cylinder 56 is believed to be attributable to the arcuate nature of slots 80 and the Coanda effect produced by the relatively wide wall surface 82d as compared with the opposed narrow surface 82e of an adjacent petal-shaped segment 82. When the water attaches to the wall surface 82d and tends to flow outwardly therealong, a zone of lower pressure adjacent the surface of the water proximal to wall 82d is believed to tend to maintain the water on the large surface 82d at varying flow rates.

Nozzle structure 20 meets all of the important design requirements of fitting into a standard 1¾-inches aperture in bottom wall 34, it can be installed from the top of the open water distributor 32, the need for a supplementary diffusion deck therebelow is eliminated, an umbrella pattern of desirable characteristics is formed at varying waterheads and metering orifices of different sizes, the assembly is nonsnagging (resists clogging with stringy materials), is reasonably easy to mold from synthetic resin materials and equivalent compositions, may be manufactured at a low cost, does not project upwardly into the hot-water basin, and employs the same size target section for all metering cylinder sizes. In this connection, it is to be appreciated that metering cylinder 56 may be firmly affixed to jacket 46 by application of sufficient heat to protuberances 62 to cause deformation thereof to an extent to span corresponding slots 60.

Figure 4:
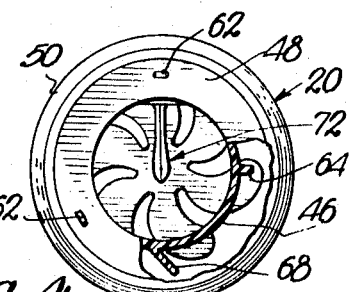
FIG. 4 is a plan view of the improved nozzle structure of the present invention, with portions thereof being broken away and in section to more clearly reveal the configuration of certain parts of the structure below the flange part thereof.

Opposed reinforcing and alignment ribs 64 integral with the outer surface of jacket 46 have tapered downwardly facing lower margins 64a to facilitate insertion of jacket 46 into a respective aperture 42, while retainer means broadly designated 66 is also provided on the outer face of jacket 46 equidistantly between opposed ribs 64 for releasably maintaining the nozzle structure 20 in a respective aperture 42. The retainer means 66 comprises a series of integral triangular tabs 68 having downwardly facing inclined lower margins 68a with each tab 68 being located in substantially tangential relationship to the outer face of jacket 46 as illustrated in FIG. 4.

Three tabs 68 are provided on each side of the jacket 46 in different spaced relationship from the lower face of flange 48 so as to permit retention of nozzle structure 20 within the floor of distributor 32, regardless of the effective thickness thereof. In addition, the cam surfaces presented by the lower margin 68a of tab 68 which are at an angle, not only with respect to the vertical but also tangentially of the metering component, permits the installer to simply push downwardly on the assembly while twisting the same clockwise viewing the FIG. 4 whereby the jacket 46 readily slips into place and the tabs 68 spring back into their normal positions below the floor 34. The uppermost tabs 68 generally remain in frictional engagement with the surface of floor 34 presenting the corresponding aperture 42 and thereby serve to cause the jacket 46 to be releasably held in proper position and preclude oscillation or rattling of the nozzle structure in the aperature therefor.

Heat sealing of metering cylinders 56 to respective tubular components presented by jackets 46 may be accomplished easily and at low cost by the simple expedient of application of heat to protuberances 62.

In the modified form of the invention illustrated in FIG. 12 of the drawing, the elements of the nozzle structure are essentially the same as those shown in FIGS. 4 to 11 inclusive with the principle exception being the construction and configuration of target means 170 which differs somewhat from the target 70. In the instance of target section 170, the petal segments 182 therefore are of the same general shape in plan as petal segments 82 but are of uniform cross section and do not have the recesses 84 in the underfaces thereof. In this case, the nozzle structure is thereby better adapted for use in those situations where the waterhead in distributor 32 remains at a relatively constant high level and no problems are normally presented of low waterheads or cavitation resulting therefrom.

In another modified form of water-diffusion target as illustrated in FIGS. 13 to 15 inclusive, the target section 270 carried by support 272 which is of the same construction as support 72, has a series of rectilinear, radially extending slots 280 therein which present outwardly projecting petal-shaped segments 282. As indicated in the FIG. 15, the petal-shaped segments 282 are essentially rectangular in cross section and have arcuate edge margins 282a and 282b defining opposed margins of corresponding slots 280. Again, the target 270 is better adapted for higher water loadings where low waterflow rates and cavitation are not encountered.

A further modified target means designated by the numeral 370 in FIG. 16 is essentially the same as target 70 with the exception of the diameter of edges 382a and 382b increasing as the outermost extremities thereof are approached to cause the segments 382 defined by slots 380 to be of somewhat spiral configuration. Otherwise the cross-sectional shape of the segments and their relationship to the central support 372 is the same as the corresponding elements of nozzle structure 20.

Having thus described the invention what is claimed as new and desired to be secured by Letters Patent is:

1. For use in a liquid-cooling tower having a gas-liquid contact fill assembly and a hot-liquid distributor overlying the fill assembly provided with a series of apertures therein located for gravitational flow of hot liquid therethrough from the distributor onto the fill assembly, improved liquid-stream control and diffusion nozzle structure for each of the apertures and each comprising:

a tubular component adapted to be positioned in a respective aperture in the distributor and provided with a liquid-metering passage therethrough; and stationary liquid-diffusing target means below the component in disposition to receive the stream of hot liquid thereon discharged from the metering passage thereabove, said target means having an upwardly facing, liquid-intercepting section whereby liquid cascades from the periphery thereof in an umbrella pattern, said section being provided with elongated slot means extending outwardly from the central part of the section to the periphery thereof partitioning the section into a series of individual segments, the slots being of increasing width as respective peripheral portions of the sections are approached with the width of each slot being less than the width of the corresponding segments defined thereby, said slot means being located to divide a part of the stream of hot liquid gravitating onto the section from the component thereabove into interior liquid sheets below the slot means and thereby assure relatively uniform distribution of the hot liquid over that section of the upper face of the fill assembly normally served by the nozzle structure, the outer peripheral edge of each of the segments being of generally curved shape in the plane of the upper surface of the section.

2. Structure as set forth in claim 1 wherein said slots are each of longitudinally arcuate configuration and are located in disposition causing the elongated segments of the section partitioned thereby to be of longitudinally arcuate configuration.

3. Structure as set forth in claim 1 wherein said section is provided with a series of normally vertical wall surfaces defining one margin of each slot and a beveled wall face opposed to a respective wall surface presenting the opposite margin of a corresponding slot, the beveled wall faces being located to normally face downwardly.

4. Structure as set forth in claim 1 wherein said slots are of generally linear configuration and extend radially from said central part of the section.

5. Structure as set forth in claim 4 wherein the normally upwardly facing side margins of the segments defined by said slots are of transversely curved configuration.

6. Structure as set forth in claim 1 wherein said slots are each of longitudinally arcuate configuration and are located in disposition causing the elongated segments of the section partitioned thereby to be of longitudinally arcuate configuration, the degree of curvature of each of the slots decreasing as the outermost extremity thereof is approached.

7. Structure as set forth in claim 1 wherein is provided support means depending from the component and connected to the target means for supporting the latter directly below the outlet of said passage through said component in predetermined spaced relationship therefrom.

8. Structure as set forth in claim 7 wherein said support means comprises an L-shaped member having an upper stretch joined to the component and a lower stretch connected to said central part of the target section.

9. For use in a liquid-cooling tower having a gas-liquid contact fill assembly and a hot-liquid distributor overlying the fill assembly provided with a series of apertures therein located for gravitational flow of hot liquid therethrough from the distributor onto the fill assembly, improved liquid-stream control and diffusion nozzle structure for each of the apertures and each comprising:

a tubular component adapted to be positioned in a respective aperture in the distributor and provided with a liquid-metering passage therethrough; and liquid-diffusing target means below the component in disposition to receive the stream of hot liquid thereon discharged from the metering passage thereabove, said target means having an upwardly facing, liquid-intercepting section whereby liquid cascades from the periphery thereof in an umbrella pattern, said section being provided with slot means therein partitioning the section into a series of individual segments located to divide a part of the stream of hot liquid gravitating onto the section from the component thereabove into interior liquid sheets below the slot means and thereby assure relatively uniform distribution of the hot liquid over that section of the upper face of the fill assembly normally served by the nozzle structure, and said section being provided with a series of normally upright wall surfaces defining one margin of each slot and a wall face opposed to a respective wall presenting the opposite margin of a corresponding slot, said wall surfaces each being of greater width in an upright direction than the corresponding width of an opposed wall face to increase the Coanda effect for aid sheets of liquid produced by the slots.

10. For use in a liquid-cooling tower having a gas-liquid contact fill assembly and a hot-liquid distributor overlying the fill assembly provided with a series of apertures therein located for gravitational flow of hot liquid therethrough from the distributor onto the fill assembly, improved liquid-stream control and diffusion nozzle structure for each of the apertures and each comprising:

a tubular component adapted to be positioned in a respective aperture in the distributor and provided with a liquid-metering passage therethrough;

liquid-diffusing target means below the component in disposition to receive the stream of hot liquid thereon discharged from the metering passage thereabove, said target means having an upwardly facing, liquid-intercepting section whereby liquid cascades from the periphery thereof in an umbrella pattern, said section being provided with slot means therein partitioning the section into a series of individual segments located to divide a part of the stream of hot liquid gravitating onto the section from the component thereabove into interior liquid sheets below the slot means and thereby assure relative uniform distribution of the hot liquid over that section of the upper face of the fill assembly normally served by the nozzle structure; and said component being provided with an outer tubular jacket of dimensions to be received within a corresponding aperture, a flange on the upper part of the jacket adapted to overlie the distributor to retain the component on the distributor and a tubular metering cylinder positioned within the jacket for controlling the flow of hot liquid through the respective aperture in the distributor.

11. Structure as set forth in claim 10, wherein said metering cylinder is provided with a flange thereon overlying the flange on the jacket, and retainer means projecting outwardly from the jacket at positions thereon below the distributor when the jacket is received within a corresponding aperture in the distributor to prevent accidental dislodgement of the component from the aperture.

12. Structure as set forth in claim 11, wherein said retainer means comprises a series of tabs projecting outwardly from the circumferentially extending surface of the jacket and located in substantially tangential relationship to the jacket.

13. Structure as set forth in claim 10, wherein the overall effective width of the section in a horizontal direction does not significantly exceed the transverse cross-sectional dimension of the component so that the section may be inserted through the aperture during placement of the component therein.

* * * * *